(12) United States Patent
Lyons et al.

(10) Patent No.: US 9,498,903 B2
(45) Date of Patent: Nov. 22, 2016

(54) SYSTEM AND METHOD FOR MANUFACTURING MONOLITHIC STRUCTURES USING EXPANDING INTERNAL TOOLS

(71) Applicant: The Boeing Company, Seal Beach, CA (US)

(72) Inventors: Brett I. Lyons, Chicago, IL (US); Jens Rossfeldt, Green Valley, AZ (US); Matt Wallen, Tucson, AZ (US); Neal A. Froeschner, Florissant, MO (US)

(73) Assignee: The Boeing Company, Chicago, IL (US)

( * ) Notice: Subject to any disclaimer, the term of this patent is extended or adjusted under 35 U.S.C. 154(b) by 1055 days.

(21) Appl. No.: 13/665,762

(22) Filed: Oct. 31, 2012

(65) Prior Publication Data

US 2015/0137424 A1    May 21, 2015

(51) Int. Cl.

| B29C 70/44 | (2006.01) |
|---|---|
| B29C 43/36 | (2006.01) |
| B29C 33/50 | (2006.01) |
| B29C 33/52 | (2006.01) |
| B29C 33/38 | (2006.01) |
| B29C 70/34 | (2006.01) |
| B29C 70/54 | (2006.01) |
| B29C 43/54 | (2006.01) |

(Continued)

(52) U.S. Cl.
CPC ....... B29C 43/3642 (2013.01); B29C 33/3842 (2013.01); B29C 33/505 (2013.01); B29C 33/52 (2013.01); B29C 43/54 (2013.01); B29C 70/342 (2013.01); B29C 70/44 (2013.01); B29C 70/446 (2013.01); B29C 70/54 (2013.01); *B29K 2995/0012* (2013.01); *B29K 2995/0059* (2013.01); *B29L 2031/757* (2013.01); *B33Y 10/00* (2014.12); *B33Y 80/00* (2014.12)

(58) Field of Classification Search
CPC ....... B29C 70/34; B29C 70/46; B29C 70/44; B29C 70/446; B29C 33/3842
USPC .......................................................... 264/317
See application file for complete search history.

(56) References Cited

U.S. PATENT DOCUMENTS 4,165,358 A * 8/1979 Johnson ............... B29C 33/202
                                                            264/102
4,292,101 A    9/1981 Reichert
(Continued)

FOREIGN PATENT DOCUMENTS

| EP | 1310351 | 5/2003 |
|---|---|---|
| EP | 1800825 | 6/2007 |
| GB | 2040790 | 9/1980 |

OTHER PUBLICATIONS

PCT/US2013/063668, International Search Report and Written Opinion, dated Apr. 4, 2014.
(Continued)

*Primary Examiner* — Galen Hauth

(57) ABSTRACT

A tooling system may include an outer mold line (OML) tool and one or more inner mold line (IML) tools. The OML tool may have an OML tool surface. Each one of the IML tools may have an IML tool surface and may be receivable within the OML tool 202. Each IML tool may be formed of expandable material. Each IML tool may apply an internal compaction pressure to a composite assembly positioned between the OML tool surface and the IML tool surface when the expandable material is heated.

20 Claims, 14 Drawing Sheets

(51) Int. Cl.
*B33Y 10/00* (2015.01)
*B33Y 80/00* (2015.01)
*B29L 31/00* (2006.01)

(56) References Cited

U.S. PATENT DOCUMENTS

| | | | | |
|---|---|---|---|---|
| 4,389,367 | A * | 6/1983 | Hudson | 264/570 |
| 4,693,678 | A * | 9/1987 | Von Volkli | B29C 70/342 |
| | | | | 264/510 |
| 6,340,509 | B1 * | 1/2002 | Nelson | B29C 33/40 |
| | | | | 156/156 |
| 6,713,008 | B1 | 3/2004 | Teeter | |
| 6,828,373 | B2 | 12/2004 | Artz et al. | |
| 2009/0014919 | A1 * | 1/2009 | Rossfeldt et al. | 264/454 |
| 2010/0000667 | A1 * | 1/2010 | Funnell | 156/189 |
| 2010/0237531 | A1 | 9/2010 | Lyons | |
| 2011/0209807 | A1 * | 9/2011 | Wilson | B29C 33/48 |
| | | | | 152/450 |

OTHER PUBLICATIONS

PCT/US2013/063668, International Preliminary Report on Patentability, dated May 5, 2015.

Chinese Office Action for Appl. No. 2013800568066, dated Jun. 2, 2016.

* cited by examiner

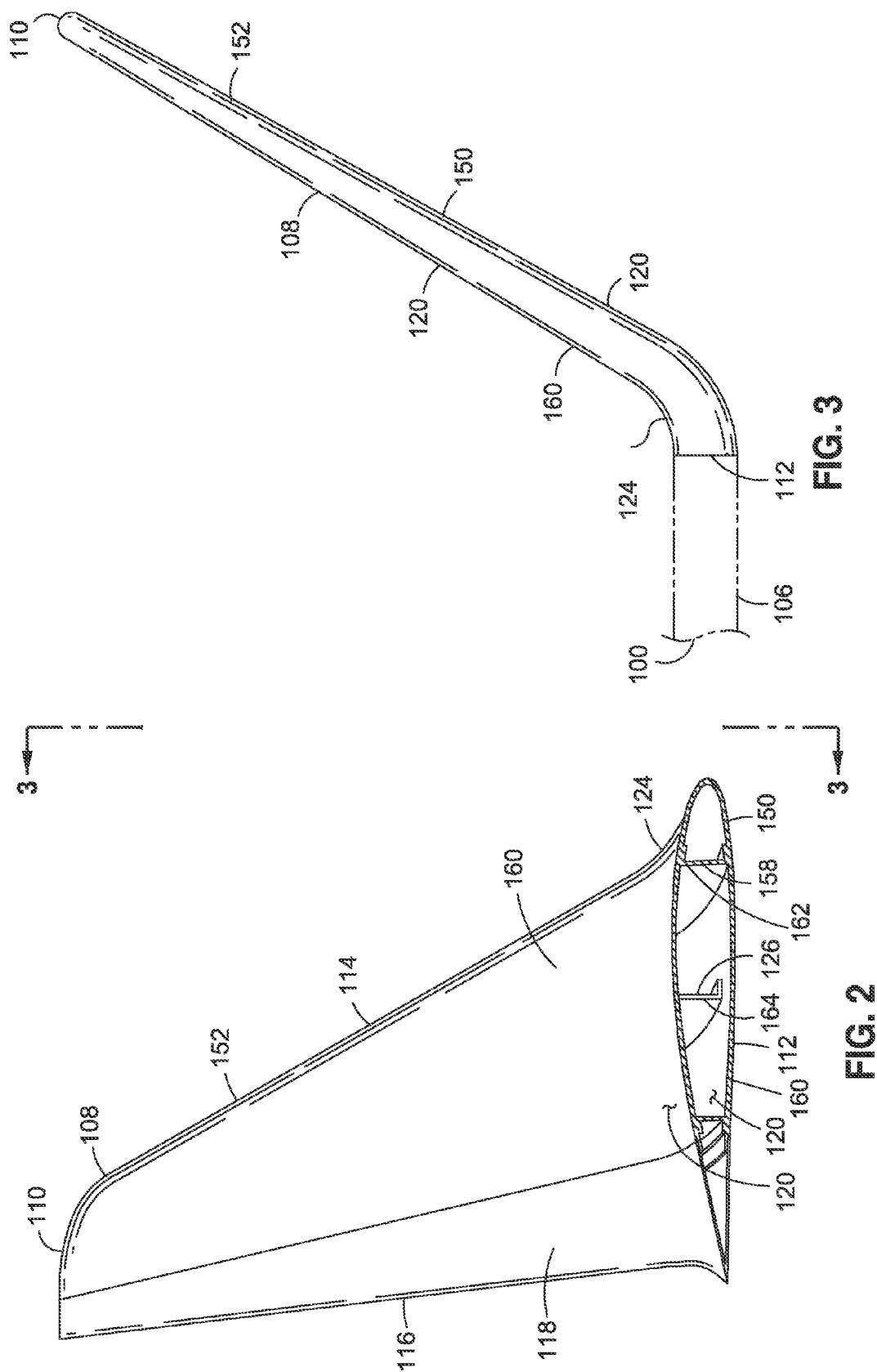

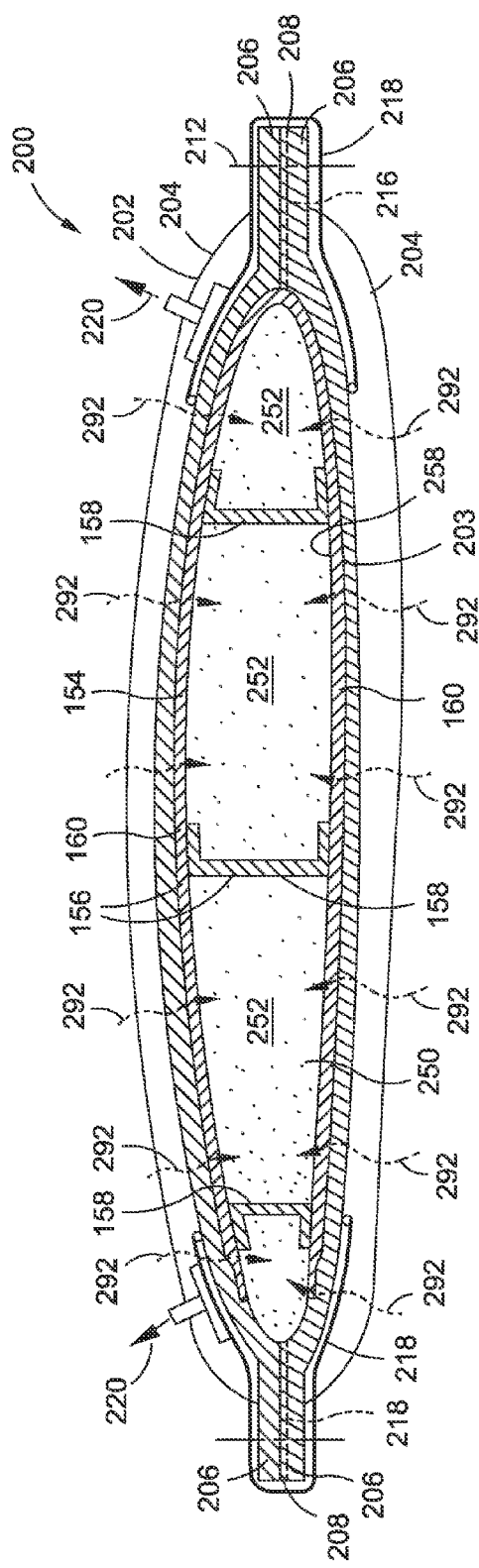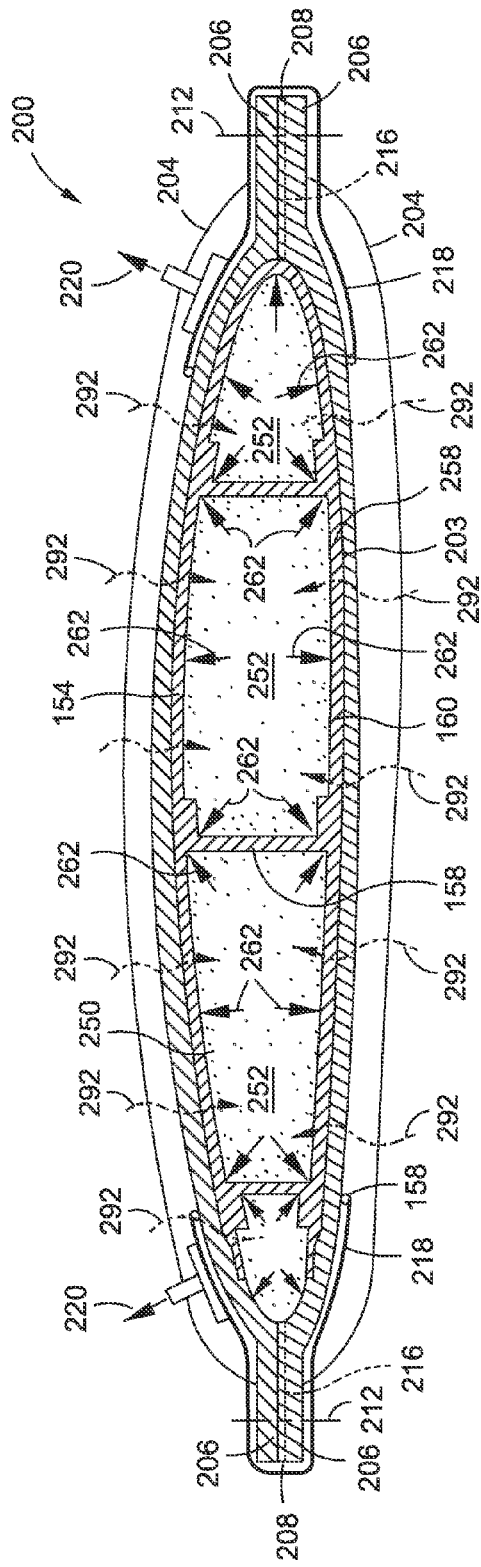

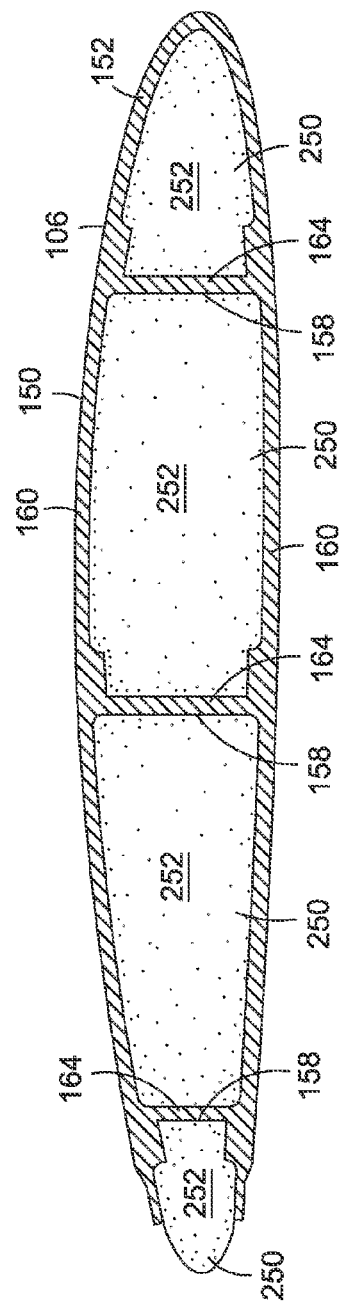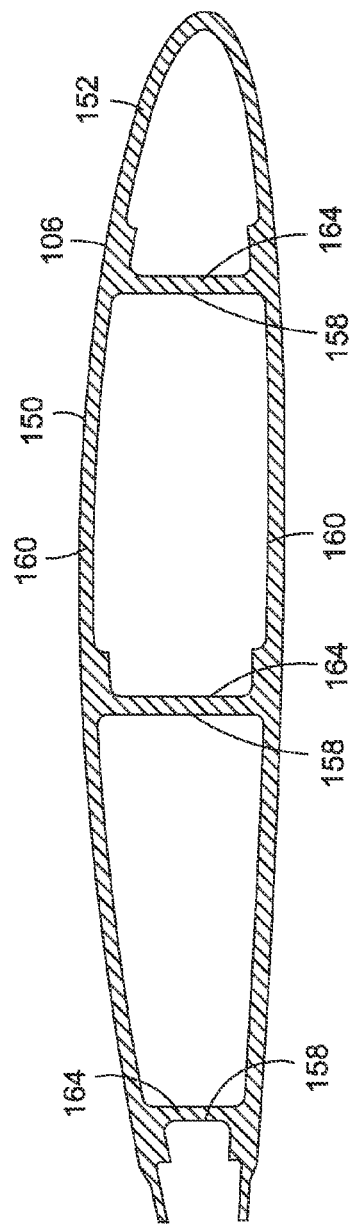

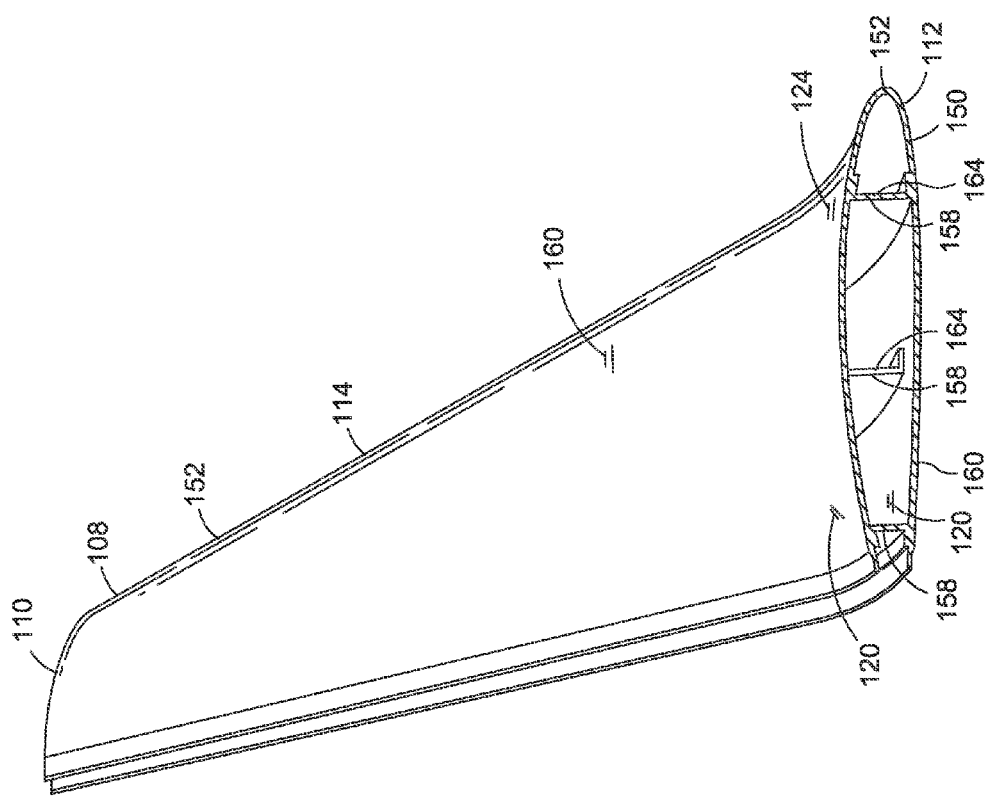

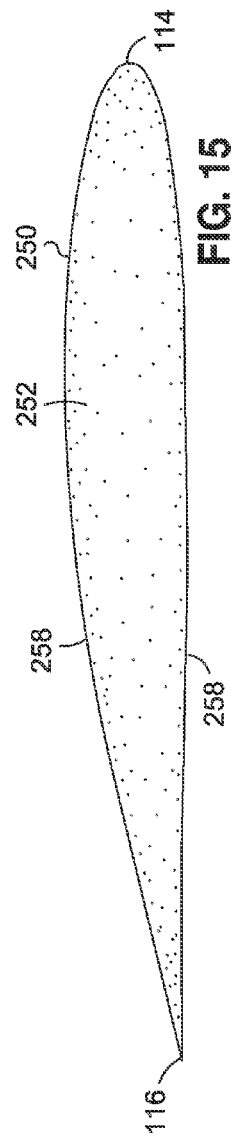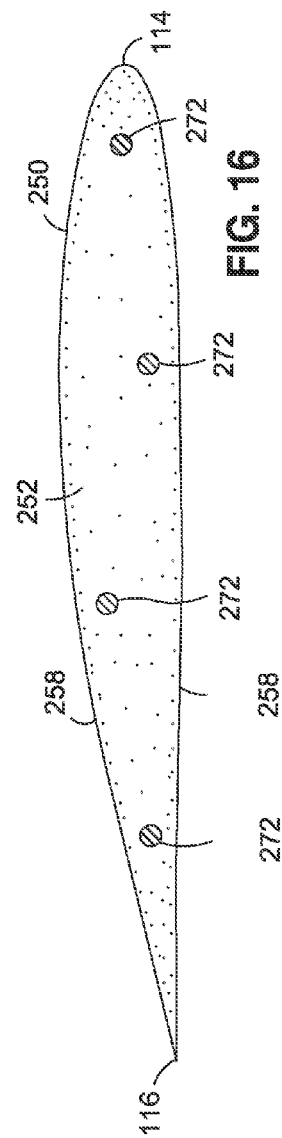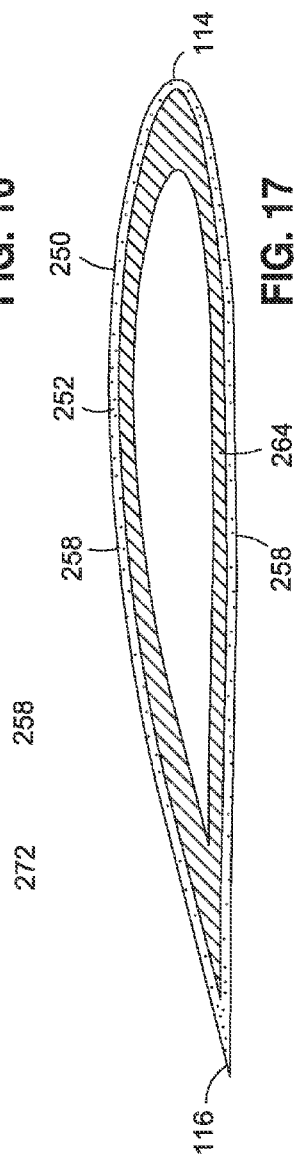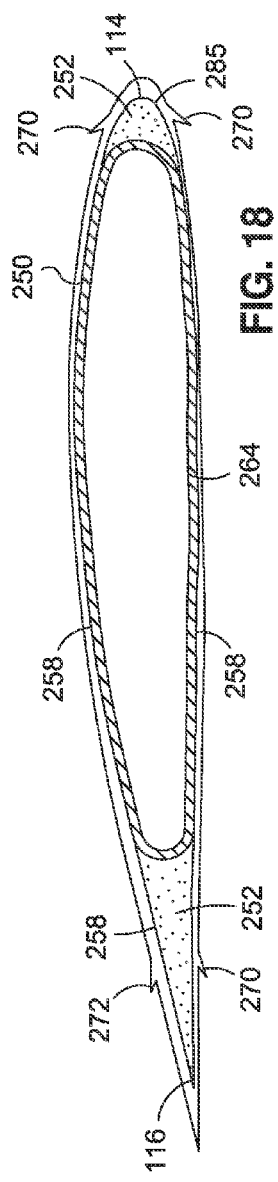

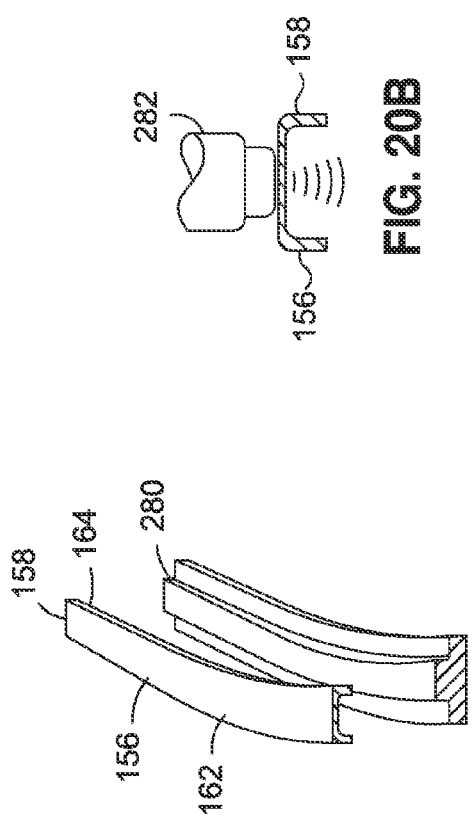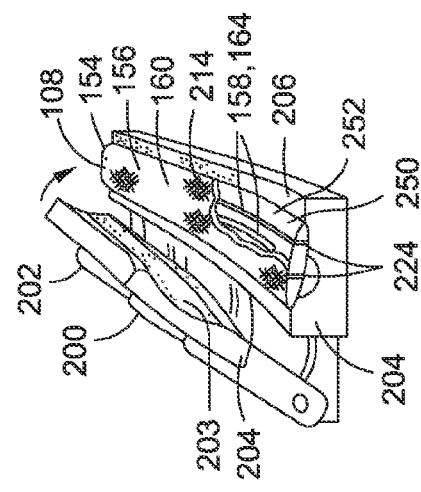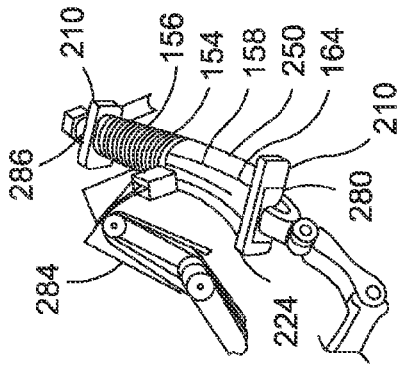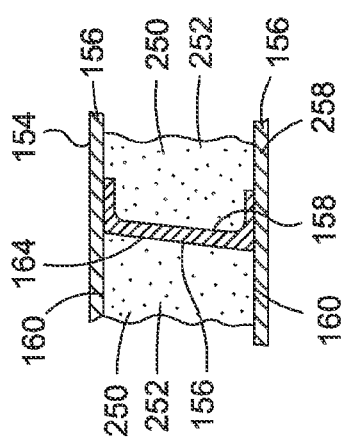

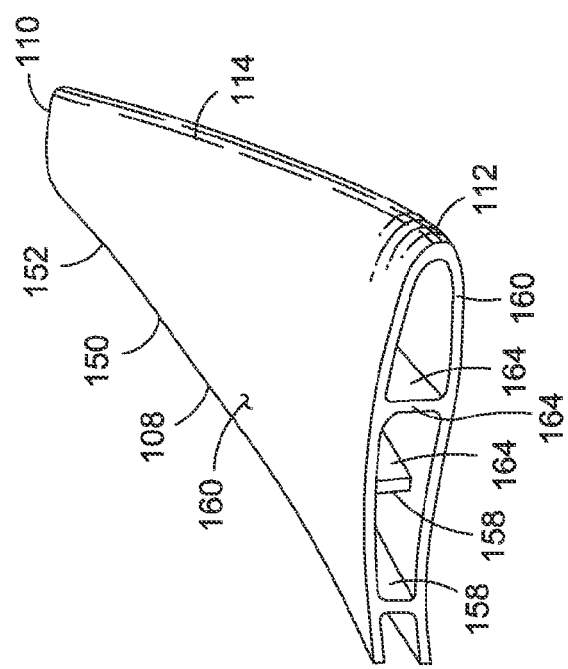
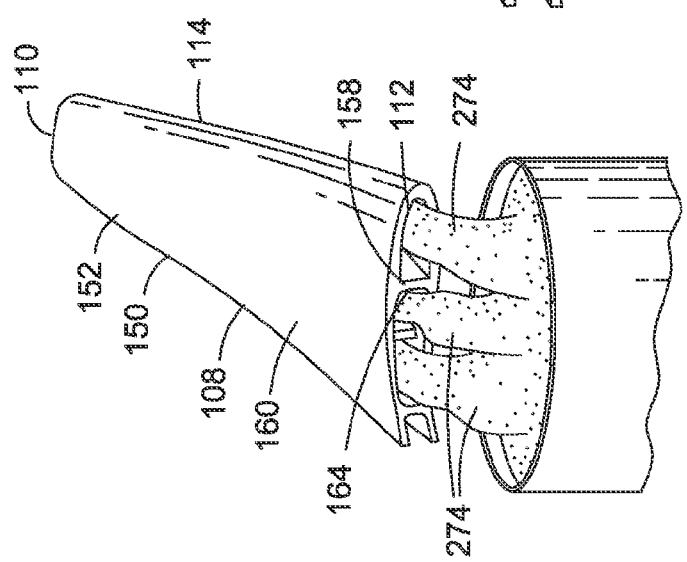
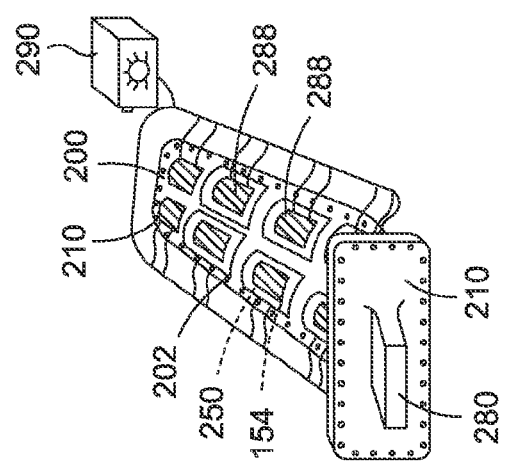

SYSTEM AND METHOD FOR MANUFACTURING MONOLITHIC STRUCTURES USING EXPANDING INTERNAL TOOLS

FIELD

The present disclosure relates generally to composites manufacturing and, more particularly, to the manufacturing of composite articles having hollow interiors.

BACKGROUND

Composite structures are used in a wide variety of applications. In aircraft construction, composites are used in increasing quantities to form the fuselage, wings, and other components. The wings of an aircraft are generally hollow structures that require a smooth and dimensionally-accurate outer mold line (OML) surface. The wings may be constructed of composite skin members and may include internal components such as composite ribs, spars, and/or stiffeners to increase the strength and bending stiffness of the wings.

In conventional construction techniques for forming composite structures such as an aircraft wing or a fuselage, composite stiffeners or other internal components may be assembled to a skin member by bonding and/or mechanically fastening. For co-bonding operations, a mandrel may be positioned within an interior of the stiffener to support the stiffener during the application of pressure when bonding the stiffener to the inner surface of the skin member. The mandrel may be formed using a hardenable mixture such as a plaster mixture.

Unfortunately, removal of hardened plaster from the interior of a composite structure may require the use of mechanical force to break up the plaster into smaller pieces. The use of mechanical force may pose a risk to the integrity of the composite structure. In addition, the process of forming the mandrel and removing the hardened plaster material is labor intensive and time consuming. Furthermore, plaster material is a generally non-recyclable material that is discarded as waste after each use.

Inflatable mandrels are also used in conventional processes for manufacturing hollow composite structures. An inflatable mandrel may be positioned within a hollow composite layup that may be supported by a closed female mold. The inflatable mandrel may be inflated to apply an internal compaction pressure on the composite layup against the female mold to consolidate and cure the composite layup. After consolidation and/or curing of the composite layup, the mandrel may be deflated and removed from the cured composite article. Unfortunately, an inflatable mandrel is generally limited in the ability to form the inner surface geometry to a high level of accuracy. In addition, inflatable mandrels may be limited in the temperatures to which they may be exposed. For example, certain composite materials may require curing at temperatures greater than 450 F which may exceed the operating limits of inflatable mandrels.

As can be seen, there exists a need in the art for a tooling system and method that minimizes or eliminates the need for bonding or mechanically fastening an assembly of components to form a hollow composite article. In this regard, there exists a need in the art for a tooling system and method that provides a means for producing unitized, monolithic composite articles having dimensionally-accurate inner and outer mold line surfaces with complex three-dimensional geometry.

SUMMARY

The above-noted needs associated with tooling systems for hollow composite articles are specifically addressed and alleviated by the present disclosure which provides a tooling system which may include an outer mold line (OML) tool and one or more inner mold line (IML) tools. The OML tool may have an OML tool surface. Each one of the IML tools may have an IML tool surface and may be receivable within the OML tool. Each IML tool may be formed of material that expands when heated. Each IML tool may apply an internal compaction pressure to a composite assembly positioned between the OML tool surface and the IML tool surface when the expandable material is heated.

In a further embodiment, disclosed is a tooling system which may include an outer mold line (OML) tool and a plurality of inner mold line (IML) tools. The OML tool may have an OML tool surface. Each one of the IML tools may have an IML tool surface and may be receivable within the OML tool. Each IML tool may be formed of a material that expands when heated and is soluble in water or other polar solvents after processing. Each IML tool may apply an internal compaction pressure to a composite assembly positioned between the OML tool surface and the IML tool surface when the expandable material is heated. The composite assembly may include an internal component that may interposed between a pair of the IML tools for applying an internal compaction pressure to the internal component upon expansion of the expandable material.

Also disclosed is a method of manufacturing a composite article. The method may include providing an outer mold line (OML) tool having an OML tool surface, and loading an inner mold line (IML) tool within the OML tool. The IML tool may have an IML tool surface and may be formed of expandable material. The method may include positioning a composite assembly between the OML tool surface and the IML tool surface, heating the expandable material to cause expansion thereof, and applying an internal compaction pressure on the composite assembly against the OML tool surface in response to the expansion of the expandable material.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is a side view of a unitized, monolithic winglet formed of composite material;

FIG. 3 is a front view of the winglet shown in FIG. 2;

FIG. 9 is a diagrammatic view of the composite assembly and IML tools captured between the mated halves of the OML tool and illustrating the application of heat to the expandable IML tools and composite assembly;

FIG. 10 is a diagrammatic view of the composite assembly and IML tools installed within the mated halves of the OML tool and illustrating the internal compaction pressure applied by the expandable IML tools to the composite assembly during heating of the expandable IML tools;

FIG. 12 is a diagrammatic view of a cured composite article and the IML tools after removal thereof from the OML tool;

FIG. 13 is a diagrammatic view of the cured composite article following removal of the expandable IML tools from the composite assembly by solublizing the IML tool material;

FIG. 14 is a perspective view of the cured composite article formed as a unitized, monolithic winglet;

FIG. 15 is an embodiment of an IML tool formed of a single material;

FIG. 16 is an embodiment of an IML tool having a plurality of reinforcing members extending through the IML tool;

FIG. 17 is an embodiment of an IML tool having a hollow internal shell;

FIG. 18 is an embodiment of an IML tool wherein the hollow internal shell forms at least a portion of the IML tool surface and including expandable material on opposing ends of the hollow shell;

FIGS. 20A-20H are schematic diagrams of an embodiment of a process for manufacturing a unitized, monolithic composite article.

DETAILED DESCRIPTION

Figure 1:
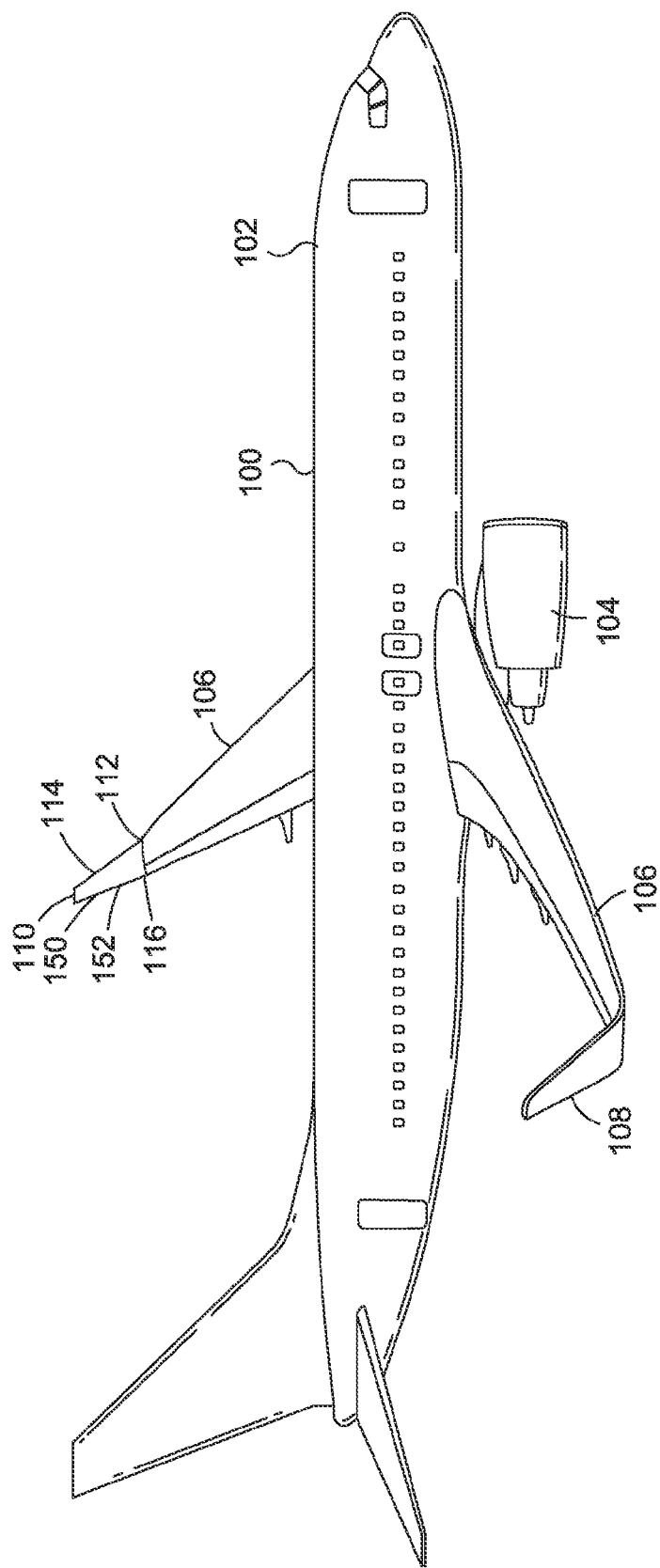
FIG. 1 is a perspective view of an aircraft having winglets.

Referring now to the drawings wherein the showings are for purposes of illustrating preferred and various embodiments of the disclosure, shown in FIG. 1 is a perspective view of an aircraft 100 having a fuselage 102 extending from a nose of the aircraft 100 to an empennage of the aircraft 100. The empennage may include one or more tail surfaces for directional control of the aircraft 100. The aircraft 100 may further include a pair of wings 106 and a pair of propulsion units 104 that may be mounted to the wings 106.

The aircraft 100 may include one or more aerodynamic structures 152 that may be fabricated from composite material. For example, the aircraft 100 may include winglets 108 mounted on the tips of the wings 106 and which may be formed of composite material. Advantageously, the tooling system 200 and method disclosed herein may provide a means for fabricating each winglet 108 as a unitized, monolithic, composite article 150 wherein internal stiffeners or spars of the winglet 108 may be integrally formed with the skin 160 of the winglet 108 such that the winglet 108 comprises a single, unitary structure.

Referring to FIG. 2, shown is a side view of an embodiment of a winglet 108. The winglet 108 may include a winglet root 112 which may be joined to a wing of the aircraft 100. The winglet 108 may further include a winglet tip 110, a winglet leading edge 114, and a winglet trailing edge 116. The winglet 108 may have a generally hollow configuration and may be comprised of a composite skin 160 and may include a plurality of internal components 158 formed of composite material such as stiffeners 162 or spars 164 for increasing the bending stiffness and strength of the winglet 108. In the embodiment shown, the winglet 108 may include a winglet trailing edge section 118 that may be separately formed from the winglet 108 and which may be later attached such as by mechanical fastening or bonding. However, the tooling system 200 may be configured to integrally form the winglet trailing edge section 118 with the winglet 108.

Advantageously, the tooling system 200 and method disclosed herein advantageously includes an outer mold line (OML) tool 202 and one or more inner mold line (IML) tools 250 or mandrels. The IML tools 250 or mandrels are formed of expanding material which advantageously provides a means for forming hollow composite structures such as the generally hollow winglet 108 illustrated in FIG. 2 without the need for assembling separate components by bonding or mechanically fastening. In this regard, the tooling system 200 and method provides a means for manufacturing composite articles 150 having a three-dimensional configuration wherein the composite article 150 includes internal components 158 such as composite stiffeners 162 or other components that extend laterally from the inner surfaces 120 of the skins 160. For example, the winglet 108 shown in FIG. 2 includes internal components 158 such as composite stiffeners 162 or spars 164 that extend between the inner surfaces 120 of the opposing composite skins 160 of the winglet 108. Furthermore, the tooling system 200 and method disclosed herein advantageously provides a means for producing unitized, integrally-formed composite articles 150 having dimensionally-accurate inner surfaces 120 and dimensionally-accurate outer surfaces 120 with complex three-dimensional geometry 126.

Referring to FIG. 3, shown is a front view of a winglet 108 illustrating the outer surfaces 120 of the winglet 108. Also shown in FIG. 3 is the three-dimensional geometry 126 of the winglet 108 wherein the winglet root 112 is curved at a juncture with the wing of the aircraft 100. Such a location may represent non-draftable geometry 124 wherein conventional internal tooling is incapable of being extracted by sliding such conventional tooling out of the interior of the cured composite article 150. Advantageously, the tooling system 200 and method disclosed herein provides a means for removal of the IML tool 250 material such as after the composite article 150 is cured.

Figure 4:
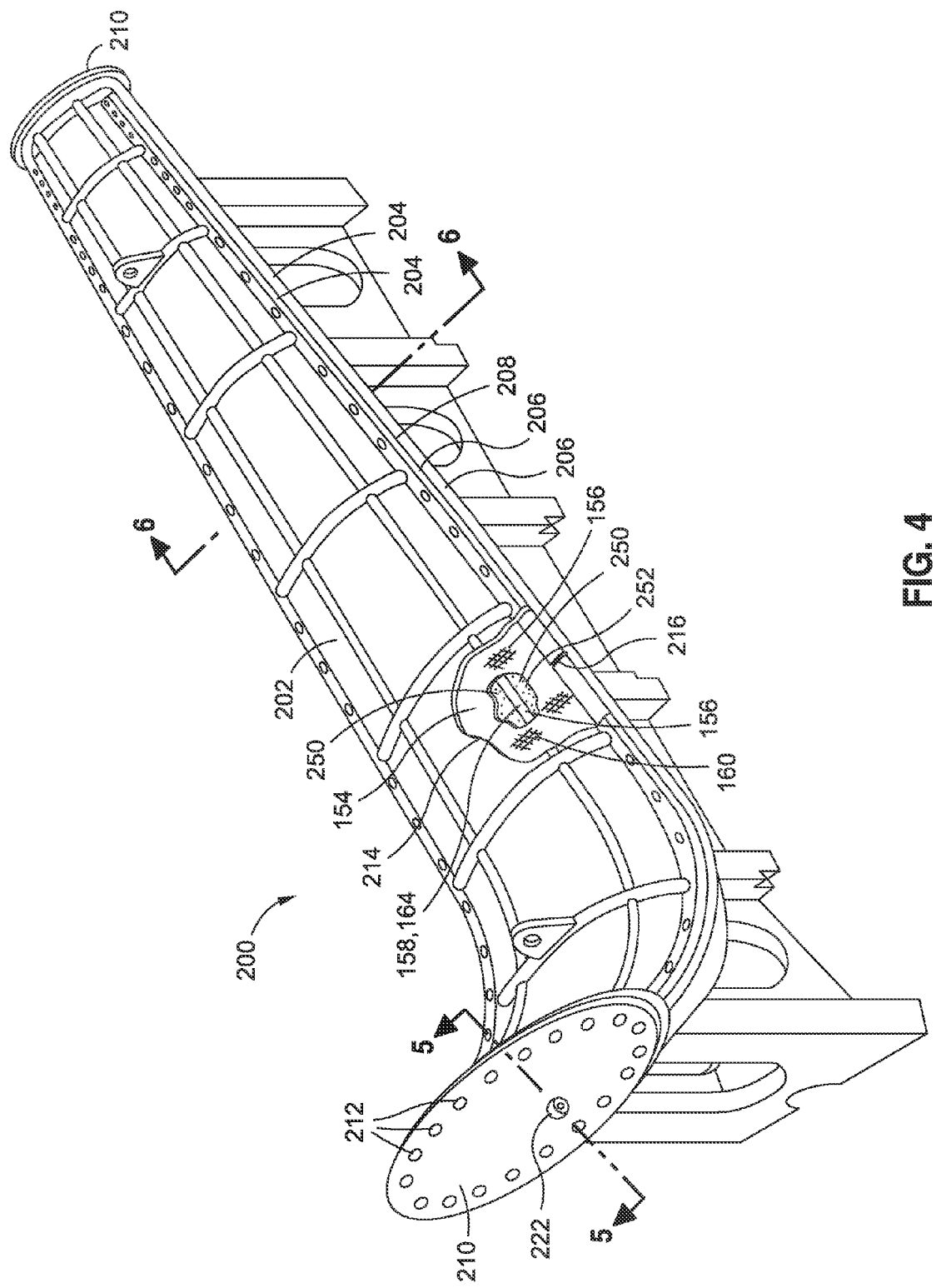
FIG. 4 is a perspective illustration of an embodiment of a tooling system for manufacturing the composite winglet and including an outer mold line (OML) tool.

Referring to FIG. 4, shown is a perspective illustration of an embodiment of a tooling system 200. The tooling system 200 disclosed herein may include an OML tool 202 mounted to a base. In the embodiment shown, the OML tool 202 is comprised of two OML tool 202 halves including an upper half 204 a lower half 204 collectively defining an OML tool surface 203 encapsulating one or more IML tools 250 and a composite assembly 154 to be consolidated and/or cured within the tooling system 200. The upper half and the lower half may include tool flanges 206 extending such that the upper half of the lower half may be mated to one another with a plurality of mechanical fasteners 212 or with other means. The OML tool 202 may include ribs or other stiffening members extending lengthwise and/or widthwise along the OML tool 202 and which may provide the OML tool 202 with sufficient stiffness to react the internal compaction pressure 262 generated by the expanding IML tools 250 when heated. The OML tool 202 may also be provided with sufficient stiffness to react autoclave pressure under repeated cycles at relatively high processing (e.g., consolidating, curing, molding, glass transition, etc.) temperatures. The OML tool 202 may further include one or more end caps 210 mountable on opposing ends of the OML tool 202 for enclosing a tool interior 214 of the OML tool 202.

In FIG. 4, OML tool 202 may be formed of Invar or any metallic or non-metallic material including composite material (e.g., carbon fiber) or any material that is CTE-compliant with composite material. The OML tool 202 is preferably formed of a material that facilitates the transfer of heat 292 to the composite assembly 154 for curing thereof and to the IML tools 250 such that the expandable material 252 may expand to generate an internal compaction pressure 262 for consolidating the composite assembly 154. The OML tool surface 203 may have a relatively high level of surface finish or a relatively low surface roughness to provide a smooth surface finish to the composite article 150 that may be cured within the tooling system 200. The OML tool 202 may be provided in any one of a variety of different sizes, shapes and configurations and is not limited to the configuration shown in FIG. 4. In this regard, the tooling system 200 and method disclosed herein may be configured to facilitate the manufacture of any one of a variety of different sizes and configurations of composite articles 150. For example, the tooling system 200 may be sized configured for manufacturing an aerodynamic structure 152 such as the winglet 108 disclosed herein, or other aerodynamic structures 152 such as a wing, a fuselage 102, a control surface, or any one of a variety of other aerodynamic or non-aerodynamic structures 152, without limitation.

Figure 5:
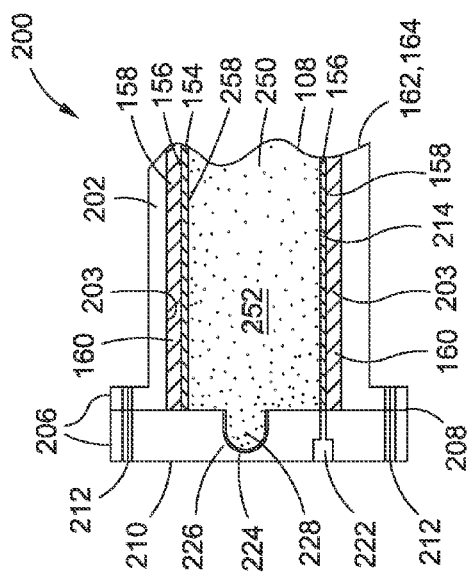
FIG. 5 is a sectional view taken along line 5 of FIG. 4 and illustrating an end cap having a locating feature for indexing the location of a composite assembly and/or IML tools relative to the OML tool.

Referring to FIG. 5, shown is a sectional view illustrating the end cap 210 mounted to the OML tool 202. The end cap 210 may include one or more locating features 224 for indexing the location of the IML tools 250 and/or the composite assembly 154 relative to the OML tool 202. In the example shown, the end cap 210 may include one or more recesses 226 that may be sized and configured for receiving a stub 228 or a tab that may be formed on each IML tool 250 and/or on the composite assembly 154, as described in greater detail below. Such locating features 224 may fix the position of the IML tool 250 and/or composite assembly 154 relative to the OML tool 202. The end cap 210 may further include one or more pressure vents 222 for venting a tool interior 214 of the OML tool 202. For example, as described below, during consolidation and/or curing of the composite assembly 154, the pressure vent 222 may be opened to facilitate the evacuation of trapped air, gas, volatiles, and/or other by-products of the heated composite assembly 154 and/or by-products of the expanding material of the IML tool(s). In an embodiment, the pressure vent 222 may be fluidly coupled to a vacuum source 220 (not shown) to facilitate the drawing of a vacuum on the tool interior 214 as described below for evacuating the tool interior 214.

Figure 6:
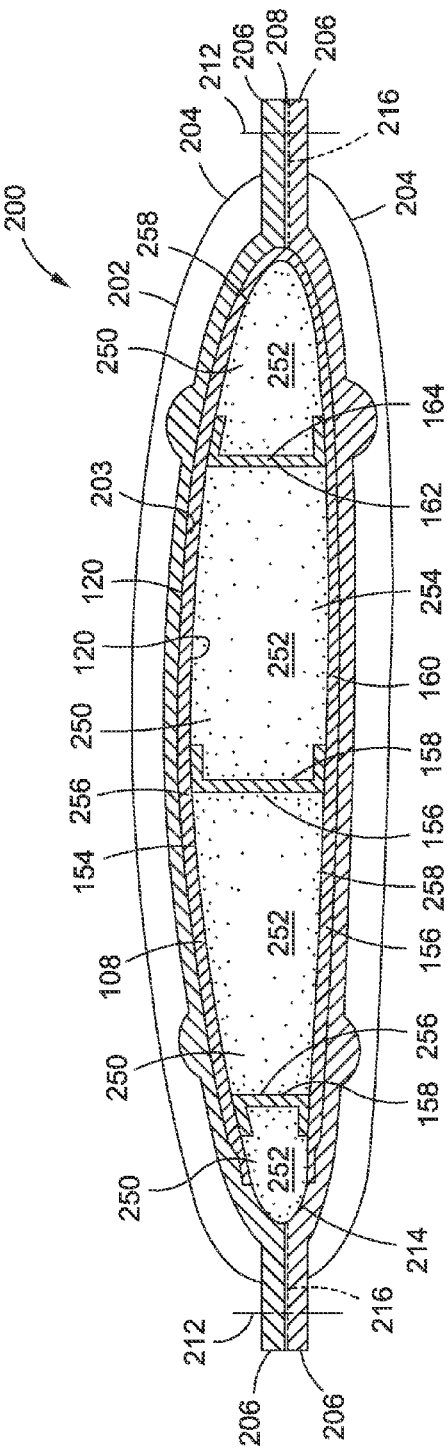
FIG. 6 is a sectional view taken along lines 6 of FIG. 4 and illustrating a composite assembly and a plurality of expandable inner mold line (IML) tools positioned within the outer mold line tool.

Referring to FIG. 6, shown is a sectional view of the tooling system 200 illustrating the composite assembly 154 and the IML tools 250 positioned within the tool interior 214 enclosed by the mated tool halves 204 of the OML tool 202. Each one of the IML tools 250 has an IML tool surface 258. The IML tools 250 are sized, shaped, and configured to be receivable within the OML tool 202 and may provide a net fit-up with the composite assembly 154 such that when the IML tools 250 are heated, a substantially uniform compaction pressure is applied along all of the surfaces 120 of the composite layup 156 that makes up the composite assembly 154. In the embodiment shown, the expandable material 252 may have a high rate of expansion to facilitate the generation of the internal compaction pressure 262 for consolidating the composite layups 156 such as the composite skin 160 positioned between the IML tools 250 and the OML tool 202, and for consolidating internal components 158 of the composite assembly 154 such as the spars 164 or stiffeners 162 of the winglet 108 positioned between pairs of IML tools 250 as shown in FIG. 6.

For example, the expandable material 252 may have a rate of expansion such that when heated, results in the generation of a substantially uniform internal compaction pressure 262 of at least approximately 85 psi applied to the composite assembly 154 positioned between the IML tool surfaces 258 and the OML tool surfaces 203. During the application of the internal compaction pressure 262, the composite assembly 154 may be heated to a predetermined temperature for a predetermined period of time to allow for consolidation and curing of the composite assembly 154 into a unitized, monolithic composite article 150. In an embodiment, the expandable material 252 may be configured to generate the internal compaction pressure of at least approximately 85 pounds per square inch for a duration of not less than approximately 60 minutes to allow time to consolidate the composite layup of the skin 160 and the internal components 158 of the composite assembly 154 and allow for removal of trapped air, gas, and other by-products.

Figure 7:
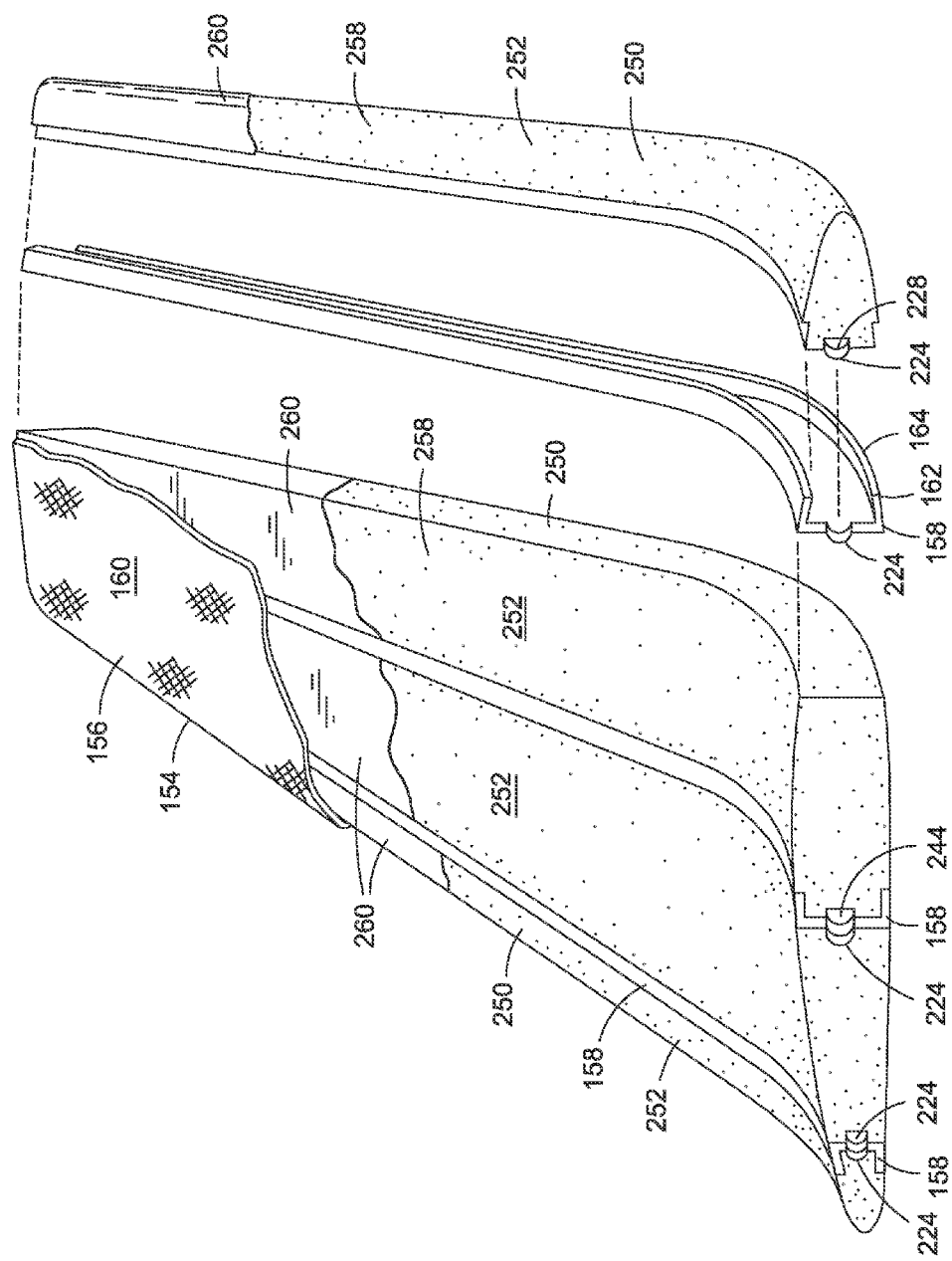
FIG. 7 is a partially exploded perspective view of a composite assembly and a plurality of the IML tools assembled with a composite assembly.

Referring to FIG. 7, shown is a partially exploded view of a composite assembly 154 of the winglet 108 which may be consolidated and/or cured within the tooling system 200 using the expandable IML tools 250. As can be seen, the composite assembly 154 may include one or more internal components 158 that may extend between a skin 160 that may be applied over the assembled IML tools 250 and internal components 158. The skin 160 and/or the internal components 158 may comprise a composite layup 156 formed of uncured or pre-cured composite material such as pre-impregnated fiber-reinforced material (e.g., pre-preg). The tooling system 200 may facilitate the co-bonding and/or co-curing of the composite layup 156 of the skin 160 with one or more other composite layups 156 of the internal components 158 to form a cured composite article 150.

One or more of the IML tools 250 may include at least one locating feature 224 for indexing or locating the IML tool 250 relative to the OML tool 202. In addition, one or more of the internal components 158 of the composite assembly 154 may include a locating feature 224 for indexing to the OML tool 202. For example, the locating feature 224 may comprise a stub 228 or tab formed on the IML tool 250 and/or on the internal component 158 of the composite assembly 154. The locating feature 224 may be laid up or formed with the composite layup 156 of a pre-cured, consolidated spar 164. Such locating features 224 on the IML tool 202 and/or composite assembly 154 may be sized and configured to be receivable within a mating locating feature 224 that may be included with or formed in the OML tool 202 such as the recesses 226 that may be formed in the end cap 210 shown in FIG. 4. However, the locating feature 224 may comprise any one of a variety of different configurations including, but not limited to, a fastener, a cavity, a groove, a pin, or any one of a variety of other configurations that may be formed on at least one of the composite assembly 154, the IML tool, and the OML tool 202 for relative indexing.

As indicated above, each IML tool 250 may be formed of expandable material 252 having a rate of expansion that causes the IML tool 250 to expand by a relatively large amount to produce the internal compaction pressure 262 forcing the composite assembly 154 against the OML tool surfaces 203. In an embodiment, each IML tool 250 may be formed of material that expands when heated such as by conduction heating, convection heating or any other type of energy input. The IML tool 250 may be formed of material that expands upon the application of other forms of energy such as microwave energy or other energy causing an increase in the temperature of the IML tool 250 material.

Advantageously, the IML tool 250 material is at least partially soluble to facilitate the removal of the IML tool 250 from the cured composite article 150 as described below. In an embodiment, the IML tool 250 may be removed by applying a polar solvent such as water, alcohol, or other solvents, to facilitate wash-out of the IML tool 250 from the cured composite article 150. Alternatively, the IML tool 250 material may be removed from a closed OML tool 202 by subjecting the IML tool 250 material to a spray or by immersing the cured composite article 150 in a solvent bath.

In FIG. 7, in an embodiment, one or more of the IML tools 250 may be substantially comprised of homogeneous or uniformly dense expandable material 252 such that each IML tool 250 is substantially isotropic wherein the IML tool 250 defines a substantial portion of the inner surfaces 120 of the composite article 150. However, one or more of the IML tools 250 may include one or more hollow passages (not shown) to facilitate heat transfer within the tooling system 200. Furthermore, one or more of the IML tools 250 may include a hollow internal shell 264 which may be at least partially surrounded by expandable material 252 as described in greater detail below. Each one of the IML tools 250 may be substantially rigid and have sufficient strength to react forces that may be applied to the IML tools 250 such as during the winding, placement, or smoothing of composite material over the IML tool surfaces 258. In addition, the IML tool 250 material may be sufficiently rigid and have sufficient strength to allow for handling, maneuvering, and positioning of the individual IML tools 250 in a factory environment. The IML tool 250 may be formed or molded by any one of a variety of different processes as described in greater detail below.

In FIG. 7, in an embodiment, at least a portion of the IML surfaces 258 may be covered by a polymer layer 260. The polymer layer 260 may comprise a stretchable film or sheet of material to accommodate the expansion of the IML tools 250 during the heating thereof. In addition, the polymer layer 260 is preferably compatible with the material system of the composite assembly 154. In an embodiment, polymer layer 260 may comprise fluorinated polymer such as polytetrafluoroethylene (e.g., Teflon™ tape) and may be porous or non-porous through-the-thickness. The polymer layer 260 is preferably relatively thin (0.001 to 0.005 inch) to minimize the impact on fiber volume fraction of the cured composite article 150. However, the polymer layer 260 may be provided in any thickness. Advantageously, the polymer layer 260 may provide a smooth finish to the inner surface of the composite article 150 and may prevent resin and/or adhesive of the composite assembly 154 from contacting the IML tool 250 and/or bonding therewith.

Figure 8:
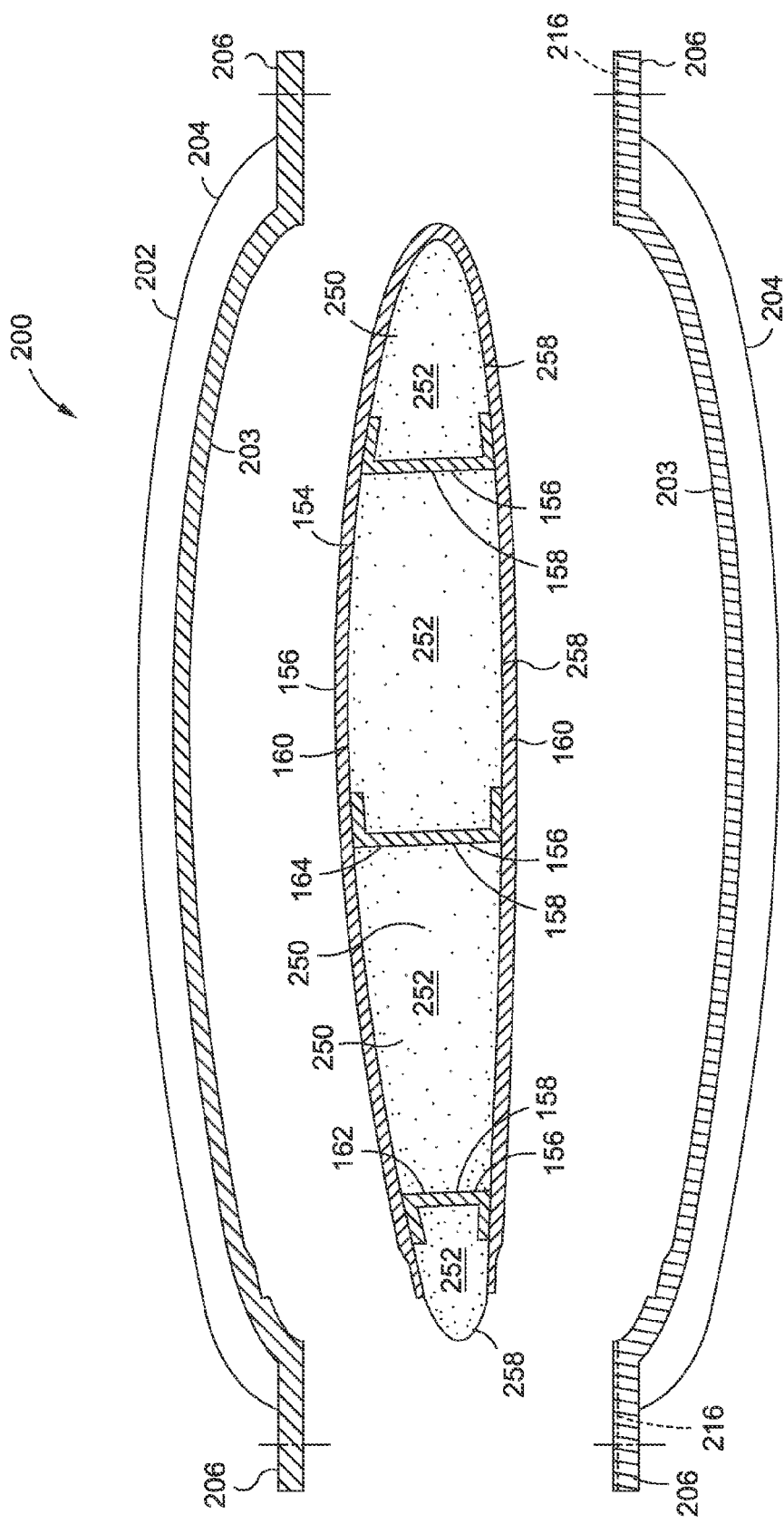
FIG. 8 is an exploded diagrammatic view of the composite assembly and IML tools positioned between mating halves of the OML tool.

Referring to FIG. 8, shown is a diagrammatic view of the composite assembly 154 and the IML tools 250 assembled together and positioned between the upper OML tool half 204 and the lower OML tool half 204. As indicated above, the IML tools 250 and/or the internal components 158 that make up the composite assembly 154 may include one or more locating features 224 (FIG. 7) for indexing the location of the IML tools 250 and/or the composite assembly 154 relative to the OML tool 202.

Referring to FIG. 9, shown is a diagrammatic view of the composite assembly 154 and the IML tools 250 captured between the mated halves 204 of the OML tool 202 and which may be sealingly mated together at the seams 208 along the tool flanges 206 using a plurality of fasteners 212 or other mating means. FIG. 9 illustrates the application of heat 292 to the OML tool 202 such as by placing the tooling system 200 within an autoclave or a convection oven or by direct heating. For example, separate heating elements (not shown) may be included with the OML tool 202 for directly heating the OML tool 202 such as by resistance elements or heating pads applied to or integrated with the OML tool 202. Although not shown, a network of thermal and/or pressure sensors such as thermocouples may be mounted to the OML tool, the IML tools 250, and/or the composite assembly 154 to track or monitor the temperature thereof at different locations.

Referring to FIG. 10, shown is a diagrammatic view of the tooling system 200 illustrating the generation of internal compaction pressure 262 resulting from the expansion of the IML tools 250 in response to the heating thereof. Advantageously, the IML tools 250 may apply a substantially uniform internal compaction pressure 262 against the surfaces 120 of the composite assembly 154. For example, the IML tools 250 may apply compaction pressure to the skin 160 positioned between the OML tool surface 203 and the IML tool surfaces 258. Compaction pressure may also be applied to the internal components 158 such as the spars 164 positioned between adjacent pairs of IML tools 250. The IML tools 250 may be formed of an expandable material 252 that expands when exposed to heat resulting in the generation of a compaction pressure sufficient for consolidating the composite layups 156 of the skin 160 and the internal components 158 and minimizing or eliminating the occurrence of voids. Heat 292 may be applied to the IML tools 250 and the composite assembly 154 for a predetermined time period to cause consolidation and curing of the composite assembly 154 into a unitized, monolithic composite article 150.

Figure 11:
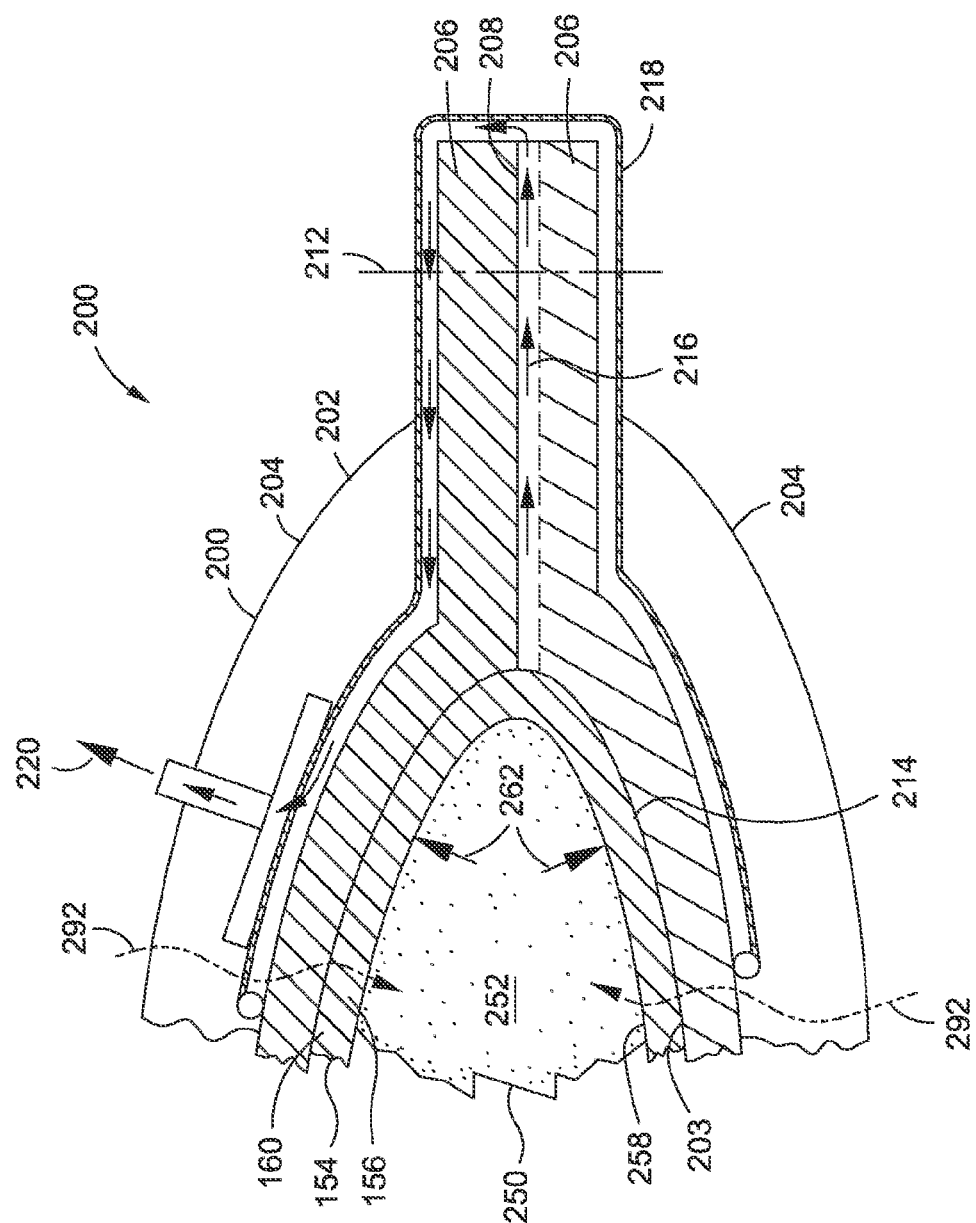
FIG. 11 is an enlarged view of a portion of the tooling system having a gas flow channel fluidly formed in the OML tool and being coupled to a vacuum source for evacuating trapped air, gas and/or volatiles from an interior of the OML tool.

Referring to FIG. 11, shown is a portion of the tooling system 200 having a gas flow channel 216 formed in the OML tool 202 to allow for gas flow from the tool interior 214 of the OML tool 202 to the exterior of the OML tool 202. Such gas flow channels 216 may allow for evacuation of air, gas, volatiles, or other by-products that may result from the heating of the IML tools 250 and/or the composite assembly 154. A series of the individual gas flow channels 216 may be formed in the tool flanges 206 of the upper tool half 204 and/or lower tool half 204 as shown in FIG. 4. The gas flow channels 216 may be provided in any configuration and may be formed at any location on the OML tool 202 to provide fluid pathways from the tool interior 214 of the OML tool 202 to the exterior of the OML tool 202.

A vacuum bag 218 may be sealed over the seams 208 of the OML tool 202 such as along the mating tool flanges 206 of the upper and lower tool halves 204. A breather layer (not shown) may be positioned underneath the vacuum bag 218 to provide a continuous path for air, gas, and volatiles. A sealant such as sealant tape may seal the edges of the vacuum bag 218 to the OML tool 202. The vacuum bag 218 may be coupled to a vacuum source 220. The vacuum bag 218 may fluidly couple the vacuum source 220 to the gas flow channels 216 to draw air, gas, or volatiles out of the tool interior 214. Although not shown, a vacuum bag 218 may also be applied over the seams 208 between the OML tool 202 and the end caps 210 that may be located on the opposing ends of the OML tool 202. In this regard, a vacuum bag 218 may be applied to any location on the OML tool 202 and is not limited to the seams 208 between the mating tool flanges 206.

Referring to FIG. 12, shown is a diagrammatic view of a cured composite article 150 and the IML tools 250 following removal thereof from the OML tool 202. As can be seen, the internal components 158 and the skin 160 are consolidated and integrated together during the curing of the composite assembly 154. The IML tools 250 may be trapped within the interior of the cured composite article 150 due to non-draftable geometry 124 (FIG. 3) such as the curved geometry at the winglet root 112 as shown in FIG. 3. As indicated above, non-draftable geometry 124 may prevent extraction of the IML tools 250 by sliding out from the interior of the cured composite article 150.

Referring to FIG. 13, shown is a diagrammatic view of the cured composite article 150 following removal of the IML tools 250. Advantageously, the IML tools 250 are formed of expandable material 252 that is soluble upon exposure to a solvent. Such solvent may include water or polar solvents such as alcohol. The expandable material 252 may be exposed to solvent such as by solvent spray to wash out the IML tools, by immersion in a solvent bath, of by any other process for exposing the expandable material 252 to a solvent.

Referring to FIG. 14, shown is the cured composite article 150 formed as a unitized, monolithic winglet 108. The cured composite article 150 advantageously has seamless, smooth, and dimensionally-accurate outer surfaces 120 and smooth, dimensionally-accurate inner surfaces 120. Furthermore, the ability to form complex, three-dimensional geometry 126 such as the internal spars 164 and skin 160 into a unitary structure significantly increases the range of shapes and configurations for OML lofts for such aerodynamic structures 152. However, as indicated above, the tooling system 200 and method disclosed herein may be implemented for manufacturing composite articles 150 for any vehicular or non-vehicular application and is not limited to forming aerodynamic structures 152.

Referring to FIG. 15, shown is an embodiment of an IML tool 250 for a composite article 150 such as an aerodynamic structure 152 having a leading edge and a trailing edge. The IML tool 250 is shown formed as a homogenous structure comprised of uniformly-dense expandable material 252 such that the IML tool 250 is substantially isotropic. The embodiment of the IML tool 250 defines a substantial portion of the inner surfaces 120 of the composite article 150.

Referring to FIG. 16, shown is an embodiment of an IML tool 250 having reinforcing members 272 provided within an interior of the expandable material 252. The reinforcing members 272 may extend at least partially through the IML tool. The reinforcing members 272 may be formed of any relatively stiff material including steel, ceramic, composite, or any other material that may increase the stiffness and strength of the IML tool 250 to allow for handling and positioning of the IML tool 250 such as in a factory environment or during the application or smoothing of composite material over the IML tool surfaces 258.

Referring to FIG. 17, shown is an embodiment of an IML tool 250 having a hollow internal shell 264 having a layer of expandable material 252 on an exterior of the internal shell 264. The internal shell 264 may be formed of substantially rigid material such as composite material or metallic material. Advantageously, the internal shell 264 may be re-usable and may be sized such that the internal shell 264 may be extracted from a non-draftable OML tool following the removal of the outer layer of expandable material 252 by solubilizing upon exposure to a solvent. The internal shell 264 may increase the strength and rigidity of the IML tool 250 and may advantageously reduce the amount of expandable material 252 required to form the IML tool surface 258. Although shown as a unitary structure, the internal shell 264 may be formed in sections such as shell halves (not shown) that may be joined together such as by bonding.

Referring to FIG. 18, shown is an embodiment of an IML tool 250 having a hollow internal shell 264 that forms at least a portion of the IML tool surfaces 258. The IML tool 250 may include expandable material 252 material on one or more side of the internal shell 264. For example, in FIG. 18, the IML tool 250 includes expandable material 252 details on the leading edge and trailing edge of the airfoil shape of the IML tool 250. A vacuum bag 268 may sealingly cover the IML tool 250 such that when a vacuum is drawn, the internal compaction pressure 262 is uniformly applied against the surfaces 120 of the composite article 150 positioned between the IML tool 250 and the OML tool 202. The vacuum bag 268 may include pleats 270 to accommodate expansion of the expandable material 252 when heated to assist in applying internal compaction pressure 262 in confined spaces, corners, or relatively small radii in the composite assembly 154. As indicated above, the tooling system 200 may include a vacuum bag 218 that may be sealed over the seams 208 of the OML tool 202. A vacuum may be drawn on the space between the OML tool surface 203 and the vacuum bag 268 covering the IML tool 250 to assist in applying the internal compaction pressure 262 to the composite assembly 154.

Figure 19:
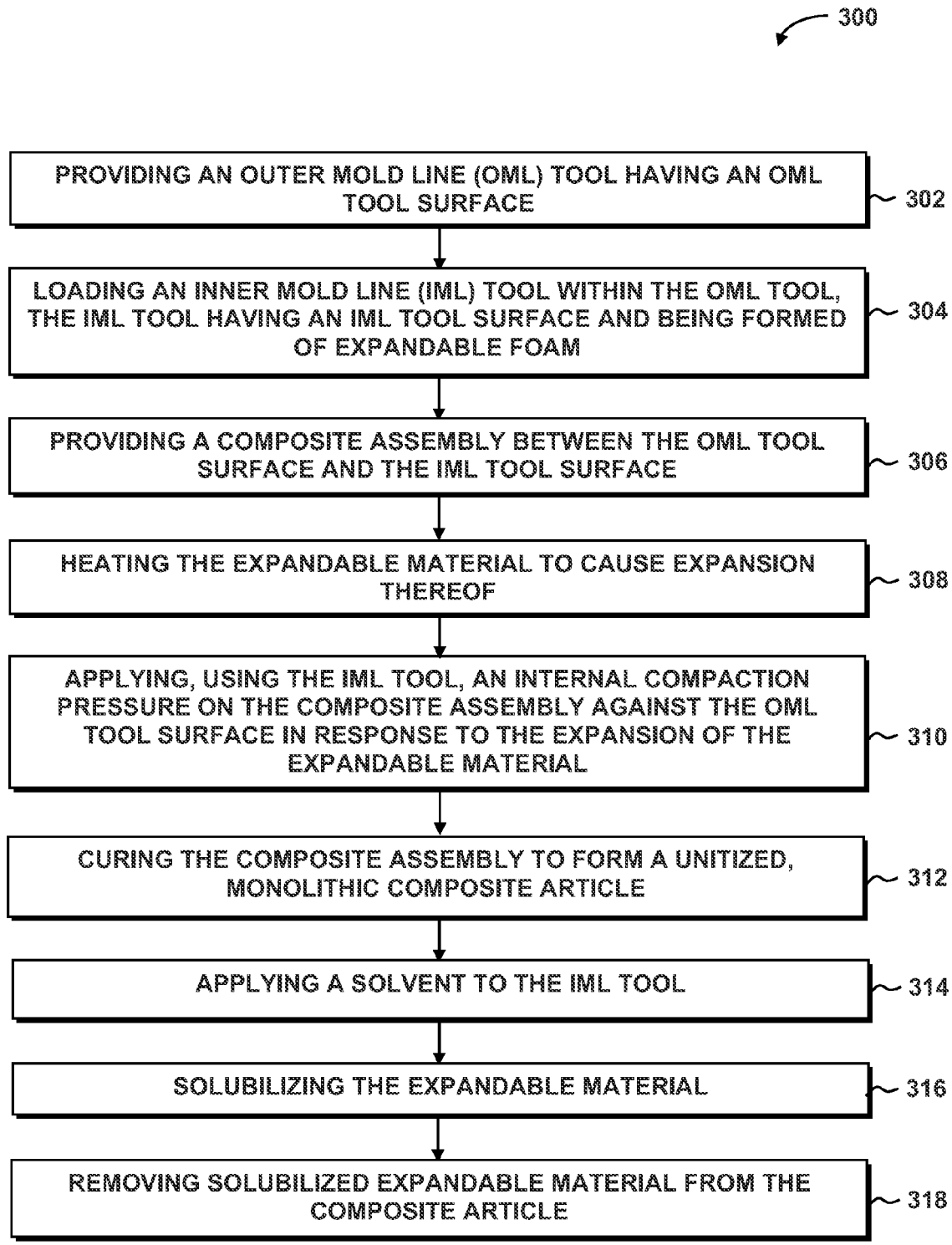
FIG. 19 is a flow chart illustrating one or more operations that may be included in an embodiment of a process for manufacturing a unitized, monolithic composite article.

Referring to FIG. 19 with additional reference to FIGS. 20A-20H, shown in FIG. 19 is a flow chart illustrating an embodiment of a method 300 or process for manufacturing a unitized, monolithic composite article 150 such as the winglet 108 disclosed and illustrated herein. FIG. 20A illustrates an internal component 158 comprising a spar 164 for a winglet 108 formed as a pre-cured and/or consolidated composite layup 156 using a conventional mold 280. The internal component 158 (e.g., spar 164) may be included in the composite assembly 154 for consolidating and/or curing within the tooling system 200 disclosed herein. FIG. 20B illustrates an inspection device 282 for inspection of the composite layup 156 (e.g. spar 164) such as by ultrasonic inspection or other inspection method for testing the integrity of the composite layup.

Step 302 of the method 300 of FIG. 19 may include providing an OML tool 202 having an OML tool surface 203. FIG. 20C illustrates the composite assembly 154 including the IML tools 250 positioned within an OML tool 202. The OML tool 202 may be comprised of upper and lower tool halves 204 in a clamshell configuration. The tool halves 204 may be hingedly coupled together and may be sealingly mated to one another to collectively define the OML tool surface 203 for encapsulating the composite assembly 154 including IML tools 250.

FIG. 20C is a sectional view of the composite assembly 154 illustrating the internal component 158 (e.g., a spar 164) positioned between the opposing skin 160 surfaces and having a pair of IML tools 250 on opposing sides of the spar 164. FIG. 20D illustrates the application of a composite layup 156 using an automated tape laying machine 284 to form the skin 160. In FIG. 20D, end caps 210 may be attached to the assembly of the IML tools 250/internal components 158. The end caps 210 may include handling flanges 286 for manipulating the orientation of the assembly of the IML tools 250/internal components 158 during application of the composite layup skin 160. The composite layup 156 of the skin 160 may be applied by filament winding, by fiber placement, or by any other method including manual layup for applying composite material (e.g., prepreg) to form the skin 160 over the internal components 158 and over the IML tool surfaces 258.

The IML tools 250 may be formed by curing a material mixture 254 within a mold (not shown) dedicated for production of IML tools 250. The mold may comprise a closed metal mold configured to facilitate the manufacture of IML tools 250 on a production basis. A predetermined amount of material mixture 254 may be placed in the mold and cured. The resulting solid mandrel may be sealed with a polymer layer 260 such as Teflon™ prior to usage in the OML tool 202 for producing the composite article 150 in the method disclosed herein. Optionally, IML tools 250 may also be produced by curing a material mixture 254 within the OML tool 202 wherein the OML tool 202 includes removable inserts 256 (FIG. 6) or composite offsets (not shown) that are sized and configured to substantially duplicate the shape of the composite assembly 154 to be cured within the OML tool 202. Composite inserts 256 may be formed using a composite lamination process and/or with additive manufacturing. Such a method may advantageously avoid the design, manufacture, and storage of a dedicated mold for each IML tool 250. In a further embodiment, IML tools 250 may be formed by additive manufacturing such as by using three-dimensional printing of the IML tool based upon a computer aided design (CAD) model (not shown) of the IML tool 250 which may advantageously avoid development and tooling costs.

Step 304 of the method 300 of FIG. 19 may include loading the IML tool 250 within the OML tool 202 as shown in FIG. 20C. As indicated above, the IML tools 250 have IML tool surface 258. The IML tools 250 may be formed of expandable material 252 that may expand by a relatively large amount when exposed to heat such that when the expandable material is constrained, the expandable material generates an internal compaction pressure on the composite assembly. As indicated above, the method may further include applying a polymer layer 260 to the IML tool surfaces 258 prior to loading the IML tool 250 inside the OML tool 202. The polymer layer 260 may provide a smooth finish to the inner surfaces 120 of the composite article 150 and may prevent resin contact with the IML tool 250.

Step 306 of the method 300 of FIG. 19 may include providing the composite assembly 154 between the OML tool surfaces 203 and the IML tool surfaces 258 or loading the composite assembly between the surfaces 203, 258. Step 306 may be performed in conjunction with Step 304 wherein the IML tools 250/composite assembly 154 may be assembled and loaded within the OML tool 202. One or more of the internal components 158 (e.g., the spars 164) of the composite assembly 154 may be positioned between pairs of IML tools 250. The skin 160 member of the composite assembly 154 may be positioned between the OML tool surface 203 and the IML tool surfaces 258. The IML tools 250 and the internal components 158 of the composite assembly 154 may be indexed to the OML tool 202 using one or more locating features 224 (FIG. 7) that may be included with the OML tool 202.

Step 308 of the method 300 of FIG. 19 may include heating the expandable material 252 to cause expansion thereof or exposing the expandable material 252 to heat. As indicated above, the expandable material 252 of the IML tools 250 may be heated by placing the tooling system 200 within a convection oven or an autoclave. Alternatively, FIG. 20D illustrates the application of heating pads to the exterior surface of the OML tool 202 for direct heating thereof in an out-of-autoclave operation. The heating elements 288 may comprise resistive heating elements or heating pads electrically coupled to a temperature regulator 290 for regulating the temperature of the IML tools 250 and/or the composite assembly 154 during consolidation and/or curing thereof.

The method 300 may include monitoring the temperature of the expandable material 252 of the IML tools 250 and/or the temperature of the composite assembly 154. An array of thermal and pressure sensors (not shown) such as thermocouples may be mounted to the OML tool 202, the IML tools 250, and/or the composite assembly 154. The sensors may provide the ability to track the temperature and pressure at different of the IML tools 250 composite assembly 154. Temperature-time history may be recorded and used for subsequent curing operations to add repeatability to the manufacturing process for a given composite article configuration.

Step 310 of the method 300 of FIG. 19 may include applying the internal compaction pressure 262 to the composite assembly 154 against the OML tool surface 203 and applying the internal compaction pressure 262 to internal components 158 located between the IML tools 250 during expansion of the expandable material 252. The rate at which the internal compaction pressure 262 is applied to the composite assembly 154 may be adjusted by adjusting the rate of heating of the expandable material 252 such as by adjusting the temperature of the heating elements 288 using the temperature regulator 290 illustrated in FIG. 20F. The temperature may also be adjusted by adjusting the temperature within a convection oven or autoclave to control the rate at which the internal compaction pressure 262 is applied.

The method 300 may include venting the tool interior 214 of the OML tool 202 to an exterior thereof during the expansion of the expandable material 252 and the heating of the composite assembly 154. The method may include sealing a vacuum bag 218 over the OML tool 202 seams 208 and/or over the IML tools 250, and drawing a vacuum such as while the expandable material 252 is expanding. The vacuum bag 268 sealing the IML tools 250 may assist in applying uniform pressure to tight geometry of the inner surfaces 120 of the composite assembly 154. The vacuum bag 218 sealing the seams 208 of the OML tool 202 may assist in drawing trapped air, gas, volatiles, and other by-products out of the tool interior 214 through gas flow channels 216 (FIG. 11) in the OML tool 202 to improve interlaminar bonding and/or to minimize or prevent voids.

Step 312 of the method 300 of FIG. 19 may include curing the composite assembly 154 to form a unitized, monolithic composite article 150. As indicated above, the composite assembly 154 may be cured by applying heat 292 to the composite layup 156 during the application of internal compaction pressure 262. The composite assembly 154 may be cured by convection heating in a convection oven, in an autoclave, or by direct tool heating of the OML tool 202 with heating elements as mentioned above.

Step 314 of the method 300 of FIG. 19 may include applying a solvent to the IML tool. As indicated above, the solvent may comprise water or a polar solvent such as alcohol or other solvents. Step 316 of the method 300 of FIG. 19 may include solubilizing at least a portion of the expandable material 252 upon exposure to the solvent. The solublized expandable material 252 may be reduced to a generally fluid state. Step 318 of the method 300 of FIG. 19 may include removing the solubilized expandable material 274 from the composite article 150. For example, FIG. 20G illustrates the solublized expandable material 274 being poured out of a cured composite article 150 into a container such as for recycling the expandable material 274. FIG. 20E illustrates the resulting unitized, monolithic composite article 150 in the shape of a winglet 108.

Although the tooling system 200 and method of the present disclosure is described in the context of the winglet 108 (FIG. 20H) such as for an aircraft 100 as shown in FIG. 1, embodiments of the tooling system 200 may be implemented for fabricating composite structures of any type, without limitation. In this regard, the tooling system 200 and method may be implemented for fabricating composite structures for any civil, commercial, or military aircraft. In addition, the disclosed embodiments are not limited to fabrication of composite structures for aircraft and may be implemented for fabricating composite structures for any vehicle of any type, without limitation, including any marine vessel, land-based vehicle, air vehicle, and/or space vehicle, or for fabricating composite structures for any non-vehicular application.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of manufacturing a composite article, comprising;
    providing an outer mold line (OML) tool having an OML tool surface;
    loading an inner mold line (IL) tool within the OML tool encapsulating the IML tool, the IML tool having an IML tool surface having a hollow internal shell and a layer of expandable material on at least a portion of an exterior of the hollow internal shell;
    providing a composite assembly between the OML tool surface and the IML tool surface, the OML tool having a gas flow channel extending from the OML tool surface to an exterior of the OML tool;
    applying a vacuum bag over a portion of the OML tool at a location of the gas flow channel; drawing a vacuum on the vacuum bag;
    heating the layer of expandable material to cause expansion thereof,
    drawing at least one of air, gas, and volatiles through the gas flow channel from the tool interior to the exterior of the OML tool using the vacuum drawn on the vacuum bag;
    and applying, using the IML tool, an internal compaction pressure on the composite assembly against the OML tool surface during the expansion of the layer of expandable material.

2. The method of claim 1, further comprising:
    positioning an internal component of the composite assembly between a pair of IML tools; and
    applying the internal compaction pressure to the internal component positioned between the IML tools during expansion of the expandable material.

3. The method of claim 1, wherein the step of providing a composite assembly between the OML tool surface and the IML, tool surface includes:
    applying a composite layup skin to one or more IML, tool surfaces prior to loading the composite assembly and the IML tool into the OML tool.

4. The method of claim 1, wherein the step of loading the IML tool within the OML tool comprises:
    indexing the IML tool to a locating feature included with the OML tool.

5. The method of claim 1, wherein the step of loading the composite assembly in the OML tool comprises:
    indexing the composite assembly to a locating feature included with at least one of the OML tool and the IML tool.

6. The method of claim 1, further comprising the steps of:
    venting a tool interior of the OML tool to an exterior thereof.

7. The method of claim 1, further comprising the step of:
    curing the composite assembly to form a unitized, monolithic composite article.

8. The method of claim 7, further comprising the steps of:
    applying a solvent to the IML tool;
    solubilizing the expandable material; and
    removing solubilized expandable material from the composite article.

9. The method of claim 1, further comprising the step of:
    applying a polymer layer to the IML tool surface prior to loading the IML tool inside the OML tool.

10. The method of claim 1, wherein the step of providing the IML tool comprises at least one of the following:
    curing a material mixture within a mold of the IML tool;
    curing a material mixture within the OML tool having inserts sized and configured to substantially duplicate a shape of the composite assembly; and
    three-dimensional printing the IML tool based upon a computer aided design (CAD) model of the IML tool.

11. The method of claim 1, wherein the step of applying the vacuum bag includes:
    including a breather layer underneath the vacuum bag to provide a continuous path for at least one of the air, gas, and volatiles.

12. The method of claim 8, wherein:
    the solvent comprises one of water and a polar solvent.

13. The method of claim 1, further comprising the step of:
    applying heat to the composite assembly when applying the internal compaction pressure on the composite assembly against the OML tool surface.

14. The method of claim 13, wherein the step of applying heat to the composite assembly is performed using at least one of:
    a convection oven, an autoclave, direct heating of the OML tool.

15. The method of claim 1, further comprising the step of:
    monitoring a temperature of at least one of the expandable material and the composite assembly when heating the layer of expandable material.

16. The method of claim 15, wherein the step of monitoring the temperature of at least one of the expandable material and the composite assembly includes:

monitoring the temperature using an array of thermal sensors mounted to at least one of the OML tool, the IML tool, and the composite assembly.

17. The method of claim 16, wherein the step of monitoring the temperature of at least one of the expandable material and the composite assembly includes:

tracking, using the thermal sensors, the temperature at different locations within the composite assembly.

18. The method of claim 1, further comprising the step of:

adjusting a rate at which the internal compaction pressure is applied to the composite assembly by adjusting the heating of the expandable foam.

19. The method of claim 3, wherein the step of applying a composite layup to the IML tool surface comprises at least one of:

filament winding composite material over the IML tool surface; and fiber placing composite material on the IML tool surface.

20. The method of claim 19, wherein:

the composite material comprises pre-preg.

\* \* \* \* \*